(12) United States Patent
Yu et al.

(10) Patent No.: US 7,679,320 B2
(45) Date of Patent: Mar. 16, 2010

(54) AMUSEMENT APPARATUS OPERATIVE AS A DYNAMO BATTERY CHARGER

(75) Inventors: Sun Yu, Berkley, MI (US); David A. Perrin, Warren, MI (US)

(73) Assignee: Zen Design Group, Ltd., Berkley, MI (US)

( * ) Notice: Subject to any disclaimer, the term of this patent is extended or adjusted under 35 U.S.C. 154(b) by 467 days.

(21) Appl. No.: 11/253,522

(22) Filed: Oct. 19, 2005

(65) Prior Publication Data
US 2007/0090787 A1    Apr. 26, 2007

(51) Int. Cl.
*H02J 7/00*    (2006.01)
(52) U.S. Cl. .................. 320/114; 320/113; 320/115
(58) Field of Classification Search .......... 320/115, 320/114, 113
See application file for complete search history.

(56) References Cited

U.S. PATENT DOCUMENTS

| | | | |
|---|---|---|---|
| 3,629,680 A | 12/1971 | Baynes et al. | |
| 4,101,818 A | 7/1978 | Kelly et al. | |
| 4,766,361 A | 8/1988 | Pusateri | |
| 4,891,029 A | 1/1990 | Hutchinson | |
| 5,057,761 A | 10/1991 | Felegyhazi, Sr. | |
| 5,061,579 A | 10/1991 | Ishimoto | |
| 5,115,182 A | 5/1992 | Ehmke et al. | |
| 5,157,320 A | 10/1992 | Kuriloff | |
| 5,164,652 A | 11/1992 | Johnson et al. | |
| 5,280,229 A * | 1/1994 | Faude et al. ............... 320/110 |
| 5,371,453 A | 12/1994 | Fernandez | |
| 5,371,456 A | 12/1994 | Brainard | |
| 5,534,765 A | 7/1996 | Kreisinger et al. | |
| 5,643,036 A * | 7/1997 | Liu et al. .................. 446/23 |
| 5,686,811 A | 11/1997 | Bushong et al. | |
| 5,767,655 A | 6/1998 | Ostendorff et al. | |
| 5,818,197 A | 10/1998 | Miller et al. | |
| 5,892,350 A | 4/1999 | Yoshikawa | |
| 5,990,662 A | 11/1999 | Yang ......................... 320/130 |
| 6,142,846 A | 11/2000 | Ojakaar | |
| 6,171,171 B1 | 1/2001 | Barthold | |
| D438,171 S | 2/2001 | Tang et al. | |
| D446,500 S | 8/2001 | Krieger et al. | |
| 6,326,767 B1 | 12/2001 | Small et al. | |

(Continued)

FOREIGN PATENT DOCUMENTS

GB    2 355 868 A    5/2001

(Continued)

OTHER PUBLICATIONS iPowerUS Fast smart charger, Item No. 10591 from www.onlybatteries.com.

(Continued)

*Primary Examiner*—Bao Q. Vu
*Assistant Examiner*—Nguyen Tran
(74) *Attorney, Agent, or Firm*—Gifford, Krass, Sprinkle, Anderson & Citkowski, P.C.

(57) ABSTRACT

The present invention provides a dynamo battery charger adapted to provide amusement during the recharging process. The charger housing is shaped or constructed to represent an amusing apparatus that includes optional features that simulate actual components whereby the amusing optional features are operable when the battery charger is being actuated.

19 Claims, 3 Drawing Sheets

U.S. PATENT DOCUMENTS

| | | |
|---|---|---|
| 6,424,120 B1 | 7/2002 | Chen |
| 6,546,436 B1 | 4/2003 | Fainmesser et al. |
| 6,652,352 B1 | 11/2003 | MacArthur et al. |
| 6,696,922 B1 | 2/2004 | Wong et al. |
| 6,714,340 B2 * | 3/2004 | Wright ............... 359/296 |
| 6,764,373 B1 | 7/2004 | Osawa et al. |
| 6,886,647 B1 * | 5/2005 | Gotta ............... 180/65.1 |
| 7,030,592 B2 | 4/2006 | Yu |
| 7,259,541 B2 | 8/2007 | Yu et al. |
| 2002/0063550 A1 | 5/2002 | Chen et al. |
| 2003/0230716 A1 * | 12/2003 | Russell et al. ........ 250/339.13 |
| 2004/0130156 A1 * | 7/2004 | Hartman et al. ........ 290/1 A |
| 2005/0111218 A1 * | 5/2005 | Lee ............... 362/192 |
| 2006/0046610 A1 * | 3/2006 | Laurienzo et al. ........ 446/435 |

FOREIGN PATENT DOCUMENTS

| | | |
|---|---|---|
| JP | 9-58546 A | 3/1997 |
| JP | 10-55826 A | 2/1998 |
| JP | 11-288742 A | 10/1999 |
| WO | WO 02/52671 A1 | 7/2002 |

OTHER PUBLICATIONS

Dynamo Charger MR003/MR002/MR001 from www.mobile-phone-accessories.net.

* cited by examiner

AMUSEMENT APPARATUS OPERATIVE AS A DYNAMO BATTERY CHARGER

FIELD OF THE INVENTION

The present invention relates to apparatus used for recharging batteries and more particularly to a hand-operated dynamo battery charger adapted to provide amusement while charging batteries to be used with portable electronic devices.

BACKGROUND OF THE INVENTION

Dynamos are known as devices used to convert kinetic energy into electrical current. In some cases dynamos are used in conjunction with other components for providing a recharging apparatus for batteries. The dynamos are typically incorporated into the design of a system that has kinetic energy as an input, such as a motor vehicle or bicycle, wherein the dynamo is sometimes used to power electrical circuits as well as to provide charging power to a storage device such as a battery or conventional capacitor.

In other cases dynamos are used as portable recharging devices for small electronics such as radios, cell phones or the like. In these cases, a dynamo charging apparatus is provided in communication with a hand crank for allowing input of kinetic energy through rotating of the crank whereby the dynamo is driven to output electrical current. These types of portable dynamo chargers are typically designed for specific applications for recharging specific devices, and/or batteries disposed therein, rather than being adapted to recharge conventional batteries that are usable with a plurality of portable electronic devices. Additionally, it is appreciated that the kinetic energy needed to drive the dynamo charger is provided by the user cranking the handle. This can prove to be a tedious and undesirable task.

Accordingly, the present invention seeks to provide a dynamo charger that can be used for recharging batteries usable as a power source for a plurality of electronic devices in addition to providing an apparatus adapted to provide amusement to the user while providing the kinetic energy needed to drive the device.

SUMMARY OF THE INVENTION

The present invention provides a dynamo battery charger adapted to recharge external batteries as well as to provide amusement to the user during the recharging process.

The battery charger according to the invention includes a housing adapted to provide amusement while charging the battery. The housing is provided in a particular shape and/or disposed with amusing features that operate to reduce the tedium associated with the charging process.

A battery receptacle is disposed within the housing and is adapted to removably receive a battery. The battery for recharging via the present invention is of the conventional type adapted to be used with a plurality of electronic devices rather than for a specific application.

A grip is disposed on the housing that allows a user to input the kinetic energy necessary for driving the battery charger.

A dynamo is disposed within the housing and placed in mechanical communication with the grip. The dynamo operates to produce an electrical output to the battery receptacle in response to imparting kinetic energy for battery recharge. The output from the dynamo is also used to power ancillary amusement features to induce a user to manually recharge a battery and in the process obtain a level of physical exercise and curb line power consumption.

The battery charger includes an electronic circuit in electrical communication with the dynamo output and the battery receptacle. The electronic circuit is operative to condition the electrical output from the dynamo for charging the battery and driving electronic units placed in communication with the electronic circuit.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE PREFERRED EMBODIMENTS

The dynamo battery charger of the present invention is adapted to provide amusement for a user of the apparatus as well as being operative to recharge an external battery for use with electronic devices. It is appreciated that dynamo chargers require kinetic energy as an input such that electrical current may be generated and output to external devices and/or batteries. A grip is provided for imparting manual energy to the dynamo. The grip is appreciated to allow for the input of kinetic energy through a crank, or a squeeze trigger geared to translate the trigger contraction into dynamo rotation. The grip is provided in communication with the dynamo to impart kinetic energy into the device. By making the operation of the dynamo entertaining, a device user does not find the task of grip operation tedious to achieve power generation.

Figure 1A:
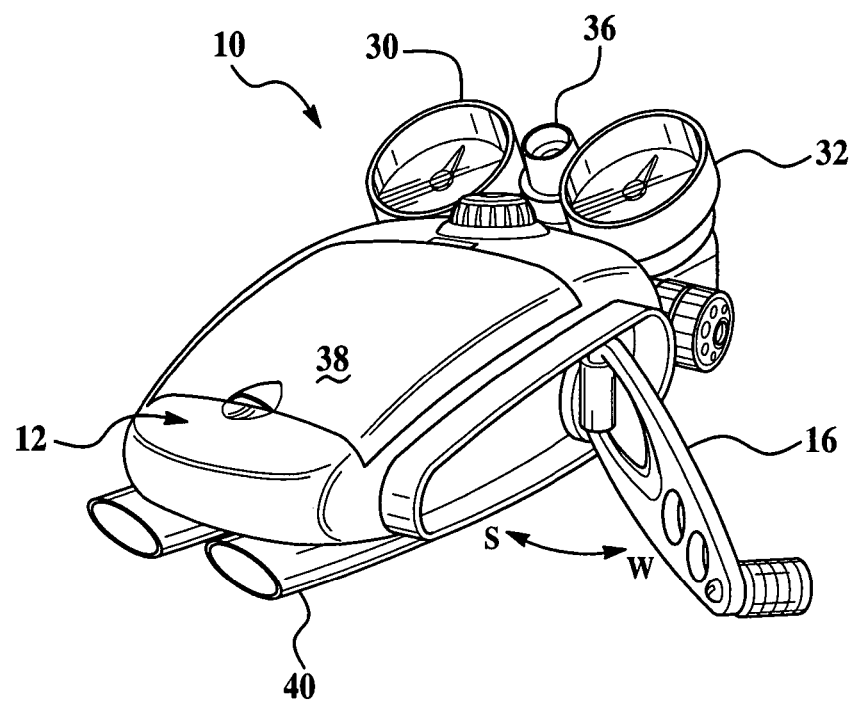
FIGS. 1A and 1B illustrate perspective views of the dynamo battery charger as according to the invention.
Figure 1B:
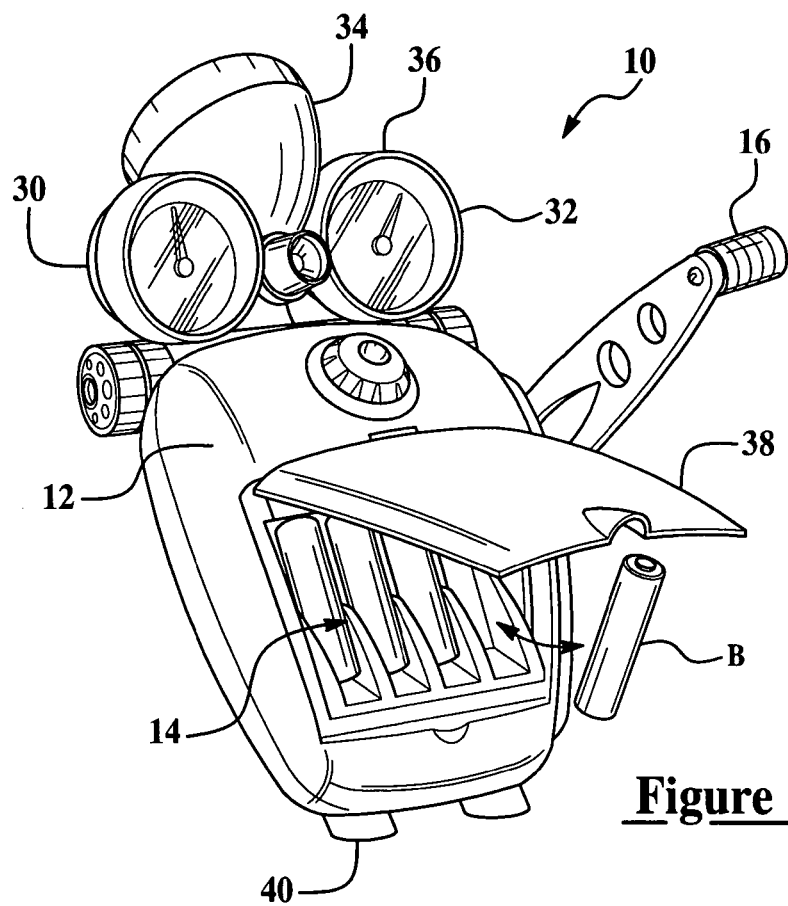
Figure 2:
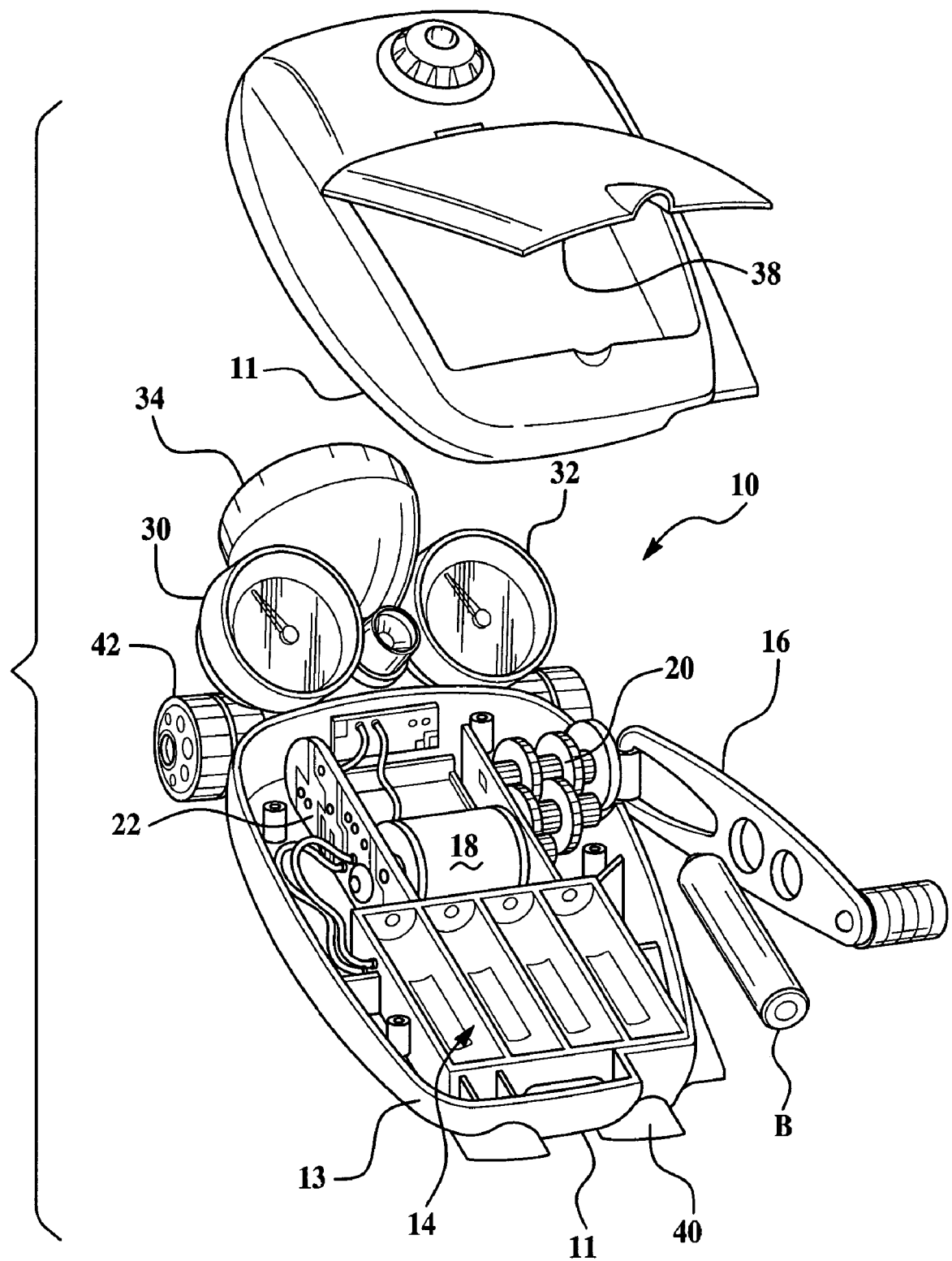
FIG. 2 illustrates a perspective view of the dynamo battery charger with the top portion of the housing removed to depict the internal components of the inventive battery charger.

Referring now to FIGS. 1A, 1B and 2, an exemplary embodiment of the dynamo battery charger 10 as according to the invention is illustrated with common shared features between the figures being identified with like numerals. The battery charger 10 includes a housing 12 with a simulative feature such as 30, 32, 34 or 36 provides amusement while charging a battery B. The housing 12 is provided in the form of a motorcycle fuel tank as a feature for providing amusement during the battery recharging process. A battery receptacle 14 is disposed within the housing 12 that is adapted to removably receive the battery B to be recharged. Preferably, the battery receptacle 14 is removable from the housing 12 and includes an electrical connection that allows it to be removed from the charging portion of the battery charger 10. In this manner a second interchangeable battery receptacle is inserted in place of receptacle 14 within the housing 12 to accommodate the charging of a battery having a dimension different than the battery B. A grip 16, depicted here as a rotatable crank, is disposed on the housing 12 for allowing a user to input kinetic energy into the battery charger 10 that in turn produces electrical energy. In the preferred embodiment, the grip 16 is operative to be selectively disposed in a working position W or a storage position S between uses. It is appreciated that a grip 16 also operative herein includes a spring-loaded trigger having a toothed surface that enmeshes with a gear in mechanical communication with the battery charger 10; such a trigger is detailed with greater specificity at 57 in the embodiment depicted in FIG. 3. Such a trigger mechanism operative herein includes that common to a sparking wheel or gun toys.

The housing 12 has a dynamo 18 disposed therein that is in mechanical communication with the grip 16. The dynamo 18 generates electrical energy in response to the grip 16 being manipulated by the user. The electrical energy is directed to the battery receptacle 14 to charge a battery B and optionally via an electrical power takeoff to the simulative feature 30, 32, 34 or 36. As shown, a gear train 20 provides the mechanical linkage between the grip 16 and the dynamo 18. It is appreciated that other forms of mechanical linkages may be provided, illustratively including belt and pulley systems.

An electrical/electronic circuit 22 is provided in communication with the dynamo 18 and the battery receptacle 14. The circuit 22 is operative to condition the electrical energy from the dynamo 18 to yield a conditioned electrical output better suited to efficiently charge a battery and optionally to also power a simulative feature 30, 32, 34 or 36 via an electrical power takeoff. In instances when the simulative feature is not powered with the electrical energy generated by the dynamo 18, a mechanical power takeoff is provided to transfer kinetic energy from the grip 16 to drive the simulative feature. The circuit 22 optionally includes subcircuits such as a rectification portion; a power takeoff portion, to drive a simulative feature; a regulation portion; a filtering portion; a threshold detection portion, to prevent overcharging; and a logic portion that determines a proper charging current to be output to the battery receptacle for charging the battery.

The battery charger 10 is optionally provided having top 11 and bottom 13 portions wherein the top portion 11 is selectably removable from the bottom portion 13 such that access to the interior components of the battery charger 10 is conveniently permitted. Further, the top portion 11 of the housing 12 is optionally provided with an access door 38 that is selectively manipulated to allow access to the battery receptacle 14 for inserting and removing batteries as needed. A simulated speedometer 30 is disposed on the housing 12 and provided in electrical communication with the electronic circuit 22. The simulated speedometer 30 is operative to produce a simulated speed value in response to receiving an electrical output from the electronic circuit 22.

Optionally, a tachometer 32 is provided operative to produce a revolutions per minute (rpm) value indication in response to receiving an electrical output from the electronic circuit 22 relating to the revolutions per minute of the dynamo 18 during charging. It is appreciated that the tachometer 32 can be in the form of a needle moving relative to a fixed dial, or includes a number of lights that illuminate selectively in response to the rpm value. Preferably, the light is a light emitting diode (LED). The lights are optionally a sequential string of lights, or a particular light that is illuminated based on the rpm range. For instance, excess rpm value illuminates a red light, proper range values illuminate a yellow light, and a deficient rpm value illuminates a green light. Optionally, an inventive charger 10 also incorporates a lamp 34 that is illuminated in response to receiving an electrical output from the circuit 22. Optionally, a watt meter 36 provides a power value indicative of output from the dynamo 18 and/or the charge level on the battery B. Additionally, ornamental features and indicia are optionally provided to enhance the aesthetic entertainment aspects of the charger 10. These features and indicia illustratively include exhaust pipes 40, air intake filters 42, and a sound synthesizing circuit (not shown) for producing an audio output similar to the sound of an operating motorcycle.

Figure 3:
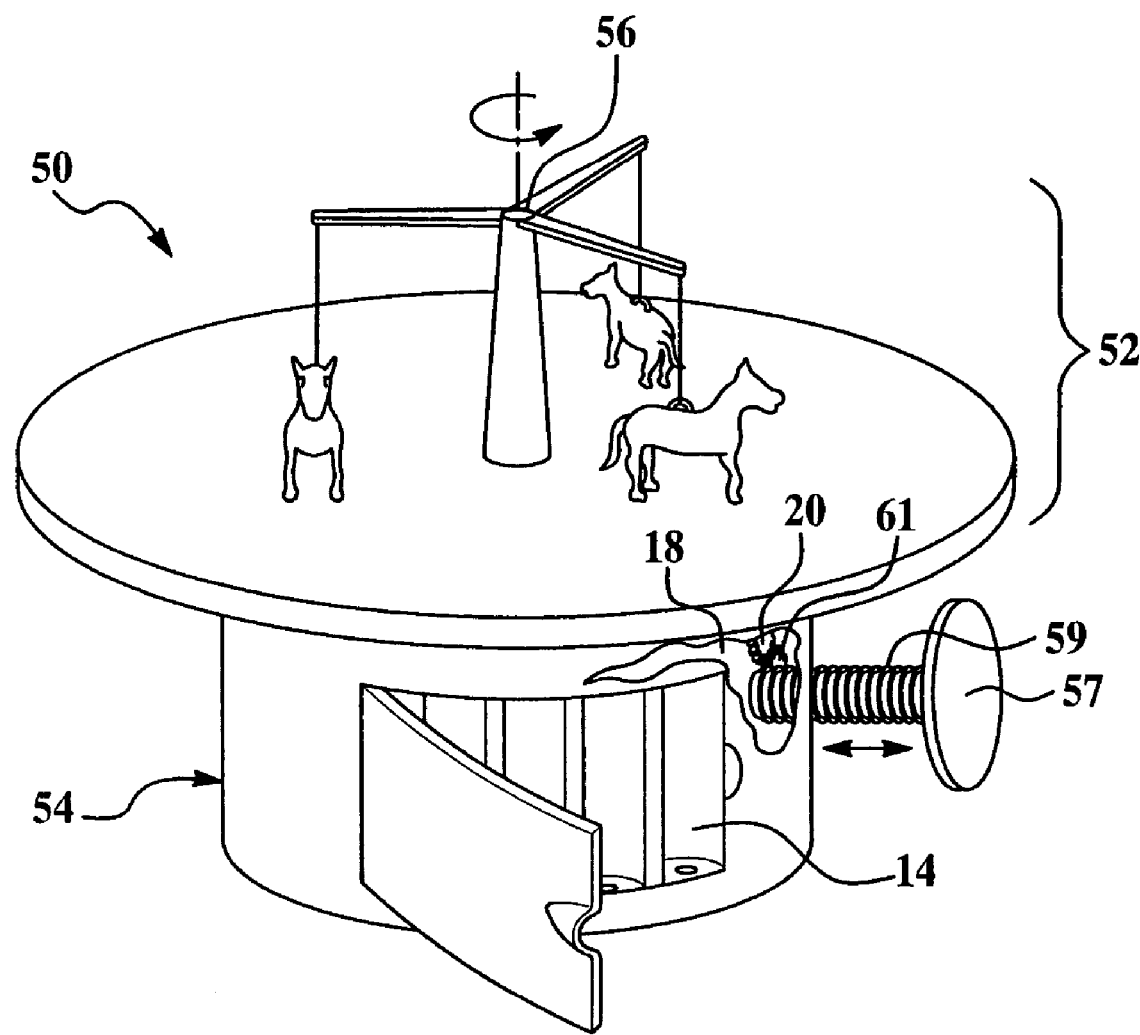
FIG. 3 is a partial cutaway view of an inventive battery charger fashioned with a simulative feature providing amusement herein depicted as a merry-go-round.

FIG. 3 depicts generally at 50 an inventive charger with a kinetic entertainment feature 52 coupled to a housing 54 where like numerals correspond to those components previously detailed with respect to FIGS. 1A, 1B and 2. The feature 52 has a rotating central spindle 56 in electrical and/or mechanical communication with gearing located within the housing 54. Preferably, a gear train has a power take-off relative to a dynamo to rotate the spindle 56. While not depicted in FIG. 3, the housing 54 contains an electrical circuit 22 described with respect to FIGS. 1A, 1B and 2. It is appreciated that the orientation and relative position of these components are readily adjusted to accommodate the size and geometry of the housing 54. A grip 57, depicted here as trigger, is provided to power a dynamo located with the housing 54. The grip 57 has a spring-loaded trigger having a toothed surface 59 that enmeshes with a gear 61 in mechanical communication with the gear train 20 and in turn drives the dynamo 18. A door 58 within the housing 54 affords access to a battery receptacle 60 suitable for receiving a battery B for charging. In FIG. 3, the feature 52 is depicted as a "merry-go-round" rotating in response to kinetic energy being input into the battery charger 50 via the grip 57. Preferably, the gear train 20 acts as a kinetic energy power takeoff to provide rotational energy to the feature 52. Alternative simulative features disposable on the housing 54 for providing amusement illustratively include a miniature train circumscribing a track, a Ferris wheel, or a music box that plays a musical tune.

A method for using an inventive dynamo battery charger includes the steps of disposing a battery within the battery receptacle and manipulating the grip continuously for a predetermined period of time at a predetermined rate such that the output from the dynamo is adequate to provide a charging current to the battery. After the predetermined time period for charging has expired, the battery is removed from the battery receptacle for use as desired.

From the foregoing, a dynamo battery charger adapted to provide amusement to the user during the battery recharging process is provided. Having described the invention, however, it is appreciated that many modifications thereto may become apparent to one of skill in the art without deviation from the spirit of the invention as defined by the scope of the appended claims.

We claim:

1. An amusement battery charger comprising:
    a simulative housing having a simulative feature that provides amusement during grip manipulation;
    a battery receptacle within said housing adapted to removably receive a battery having a battery dimension;
    a manual grip on said housing generating kinetic energy;
    a dynamo within said housing and in mechanical communication with said grip and generating electrical energy from the kinetic energy, said dynamo operative to produce an electrical output;
    an electronic circuit in electrical communication with said dynamo and said battery receptacle, said electronic circuit generating a conditioned electrical output from the electrical output and transmitting the conditioned electrical output to said battery receptacle; and
    a power takeoff for transferring a portion of the kinetic energy or the electrical energy to the simulative feature adapted to provide user amusement during grip manipulation wherein said simulative feature is a tachometer on said housing and in electrical communication with said electronic circuit, said tachometer operative to produce a revolutions per minute value in response to receiving said conditioned electrical output from said electronic circuit that is indicative of revolutions per minute of said dynamo during kinetic energy input.

2. The battery charger of claim 1 wherein said housing is in the shape of a motorcycle gas tank.

3. The battery charger of claim 1 wherein said grip is a rotating crank.

4. The battery charger of claim 2 wherein said simulative feature is a speedometer on said housing and in electrical communication with said electronic circuit, said simulated speedometer operative to produce a simulated speed value in response to receiving said conditioned electrical output from said electronic circuit.

5. The battery charger of claim 3 wherein said simulative feature is a tachometer on said housing and in electrical communication with said electronic circuit, said tachometer operative to produce a revolutions per minute value in response to receiving said conditioned electrical output from said electronic circuit that is indicative of revolutions per minute of said dynamo during kinetic energy input.

6. The battery charger of claim 3 wherein said simulative feature is a lamp on said housing and in electrical communication with said electronic circuit, said lamp operative to illuminate in response to receiving said conditioned electrical output from said electronic circuit.

7. The battery charger of claim 1 wherein said simulative feature is a watt meter on said housing and in electrical communication with said electronic circuit, said watt meter operative to produce a power value in response to receiving said conditioned electrical output from said electronic circuit.

8. The battery charger of claim 1 further comprising a gear train in mechanical communication intermediate between said grip and said dynamo.

9. The battery charger of claim 8 wherein said power takeoff is mechanically enmeshed with said gear train.

10. The battery charger of claim 1 wherein said housing has a door over said battery receptacle.

11. The battery charger of claim 3 wherein said crank is pivotable between a working position and a storage position.

12. The battery charger of claim 1 wherein said simulative feature is a merry-go-round.

13. The battery charger of claim 1 further comprising a second battery receptacle mateable with a second battery having a second battery dimension different from the battery dimension.

14. The battery charger of claim 1 wherein said power takeoff is an electrical connection communicating a portion of the conditioned electrical output to said simulative feature.

15. A method of recharging a battery comprising:
- a simulative housing having a simulative feature that provides amusement during grip manipulation;
- a manual grip on said housing generating kinetic energy;
- disposing the battery in a battery receptacle;
- manipulating the manual grip for a predetermined period to transfer energy from a dynamo to the battery and the simulative feature;
- an electronic circuit in electrical communication with said dynamo and said battery receptacle;
- a power takeoff for transferring a portion of the kinetic energy to the simulative feature adapted to provide user amusement during grip manipulation wherein said simulative feature is a tachometer on said housing and in electrical communication with said electronic circuit, said tachometer operative to produce a revolutions per minute value in response to receiving a conditioned electrical output from said electronic circuit that is indicative of revolutions per minute of said dynamo during kinetic energy input,
- monitoring the tachometer providing the revolutions per minute value indication relating to an electrical output from the dynamo;
- sensing a movement of the simulative feature as a visual or auditory input, said simulative feature providing an entertainment inducement to continue said manipulating step; and
- removing the battery from the battery receptacle.

16. The method of claim 15 wherein the simulative feature comprises a mechanical movement.

17. The method of claim 15 wherein the simulative feature comprises a music box.

18. The method of claim 15 wherein the simulative feature is the activation of a light or lamp.

19. The method of claim 15 further comprising monitoring a watt meter to provide a power value indicative of the electrical output of the dynamo during the manipulating.

* * * * *